US008242433B2

(12) United States Patent
Kim et al.

(10) Patent No.: US 8,242,433 B2

(45) Date of Patent: Aug. 14, 2012

(54) CENTRIFUGAL FORCE BASED PLATFORM, MICROFLUIDIC SYSTEM INCLUDING THE SAME, AND METHOD OF DETERMINING HOME POSITION OF THE PLATFORM

(75) Inventors: Suhyeon Kim, Seoul (KR); Jeonggun Lee, Anyang-si (KR); Beom-seok Lee, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 12/182,545

(22) Filed: Jul. 30, 2008

(65) Prior Publication Data

US 2009/0139578 A1 Jun. 4, 2009

(30) Foreign Application Priority Data

Dec. 3, 2007 (KR) ........................ 10-2007-0124384

(51) Int. Cl.
*G01D 5/34* (2006.01)

(52) U.S. Cl. ............... 250/231.13; 250/231.14; 356/614

(58) Field of Classification Search ............ 250/231.13–231.18; 422/72, 82.05; 356/614
See application file for complete search history.

(56) References Cited

U.S. PATENT DOCUMENTS

| | | | | |
|---|---|---|---|---|
| 3,954,339 | A * | 5/1976 | Atwood et al. | 250/231.13 |
| 4,709,580 | A * | 12/1987 | Butts et al. | 73/178 R |
| 5,559,602 | A * | 9/1996 | Nyui | 356/616 |
| 5,661,296 | A * | 8/1997 | Ishizuka et al. | 250/231.14 |
| 6,404,485 | B1 * | 6/2002 | Kubo et al. | 356/138 |

* cited by examiner

*Primary Examiner* — Tony Ko

(74) *Attorney, Agent, or Firm* — Sughrue Mion, PLLC

(57) ABSTRACT

Provided are a centrifugal force based platform formed to be rotatable and including a home mark having a retro-reflective property of light, and a centrifugal force based microfluidic system including the platform. The method of determining a home position of the centrifugal force based platform includes: rotating the platform formed and including a home mark having a retro-reflective property of light; emitting light from a light-emitting unit to the platform; and detecting the emitted light, which is retro-reflected by the home mark, in a light-receiving unit, and then determining the home position of the platform based on the detected light.

13 Claims, 9 Drawing Sheets

CENTRIFUGAL FORCE BASED PLATFORM, MICROFLUIDIC SYSTEM INCLUDING THE SAME, AND METHOD OF DETERMINING HOME POSITION OF THE PLATFORM

CROSS-REFERENCE TO RELATED PATENT APPLICATION

This application claims the benefit of Korean Patent Application No. 10-2007-0124384, filed on Dec. 3, 2007, in the Korean Intellectual Property Office, the disclosure of which is incorporated herein in its entirety by reference.

BACKGROUND OF THE INVENTION

1. Field of the Invention

The present invention relates to a centrifugal force based platform, a microfluidic system including the same, and a method of determining a home position of the platform.

2. Description of the Related Art

Generally, a microfluidic device has a structure including a chamber storing a minute amount of fluid, a channel through which the fluid flows, a valve for controlling flow of the fluid, and various functional units receiving the fluid to perform predetermined functions thereon. A biochip has such a microfluidic structure arranged on a chip-type substrate, and is used to analyse the performance of various assays including biological reactions. In particular, a device that is designed to perform multiple step processes and manipulations using a single chip is referred to as a lab-on-a chip (LOC).

A driving pressure is generally required to transfer the fluid within the microfluidic device, and thus, capillary pressure or a pressure generated by a specifically prepared pump is used as the driving pressure. A lab compact disk (CD) or a lab-on a disk is a recently suggested platform that is shaped as a compact disk and transfer fluid by using centrifugal force.

Such centrifugal force based platforms perform various reactions on a sample, in particular a biological sample, such as immune serum tests and gene tests, in the chambers of the platforms, according to their use. The results of the sample reactions are detected using appropriate reaction detectors. In order to perform the sample reactions in the platforms and detect the results of the sample reaction by using the reaction detectors, it is necessary that the positions of valves, functional units, and chambers for detecting the reaction, which are disposed on a disk-type platform, be correctly determined. A spot of the platform, which is a base position for determining the positions of the valves, the functional units and the chambers, is referred to as a home, and a mark indicating the home is referred to as a home mark. A conventional method of determining the home position of a centrifugal force based platform is classified into a method of detecting light reflected by a mirror, a method of detecting a position at which transmission of light is shut down, or the like. However, such conventional method has insufficient reliability in determining a home due to errors generated when a platform is assembled or a home mark is formed.

SUMMARY OF THE INVENTION

The present invention provides a centrifugal force based platform that allows a reliable detection of a home position of the platform using a retro-reflective property of incident light, and a microfluidic system including the platform, and a method of determining a home position of the platform.

According to an aspect of the present invention, there is provided a centrifugal force based platform formed to be rotatable, the platform comprising: a home mark which retro-reflects light.

According to another aspect of the present invention, there is provided a centrifugal force based microfluidic system comprising: a rotatable platform which includes a home mark having a retro-reflective property; a motor rotating the platform in a controlled manner; a light-emitting unit emitting light to a spot of the platform so as to be incident on the home mark only at a point of time when the platform rotates at a predetermined position; a light-receiving unit which detects light that is incident on the home mark and retro-reflected by the home mark; and; a controller determining a home position of the platform based on the reflective light detected by the light-receiving unit.

The light-emitting unit may comprise a laser diode (LD).

The light-receiving unit may comprise a photo diode.

The light-emitting unit and the light receiving unit may face the platform, the light-receiving unit may overlap a portion of the light-emitting unit, and the distance between the light-emitting unit and the platform is shorter than the distance between the light-receiving unit and the platform.

The system may further comprise: a mirror which is positioned between the light emitting unit and the platform, wherein the mirror passes light emitted by the light emitting unit so that the light moves to be incident on the platform, wherein the mirror reflect light that is reflected by the home mark towards the light-receiving unit, and wherein the mirror is a mirror with a window or a half mirror.

The system may further comprise: an amplification unit passing and amplifying selectively a signal selected from signals detected by the light-receiving unit, where the size of the signal is greater than or equal to a predetermined size.

The home mark may be disposed on a circumferential surface of the platform.

The home mark may comprise one of a plurality of glass beads and a plurality of microprisms, which are regularly arranged.

The microprisms may be protrusions protruding from an inner surface of a side wall of the platform.

The home mark may be a retro-reflective sheet or a retro-reflective pigments.

The home mark may be disposed inside the platform.

According to another aspect of the present invention, there is provided a method of determining a home position of a centrifugal force based platform, the method comprising: rotating the platform formed and comprising a home mark having a retro-reflective property; emitting light from a light-emitting unit to the platform; and detecting selectively the emitted light that is retro-reflected by the home mark, with a light-receiving unit, and then determining the home position of the platform based on the detected light.

The detecting of the emitted light may further comprises: passing and amplifying selectively a signal selected from signals detected by the light-receiving unit, where the size of the signal is greater than or equal to a predetermined size.

The detecting of the emitted light may further comprise: determining a point at which the emitted light is not detected any more after the emitted light is retro-reflected by the home mark so as to be detected by the light-receiving unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a centrifugal force based platform, a centrifugal force based microfluidic system including the platform, and a method of determining a home position of the platform will be described with regard to exemplary embodiments of the invention with reference to the attached drawings.

Figure 1:
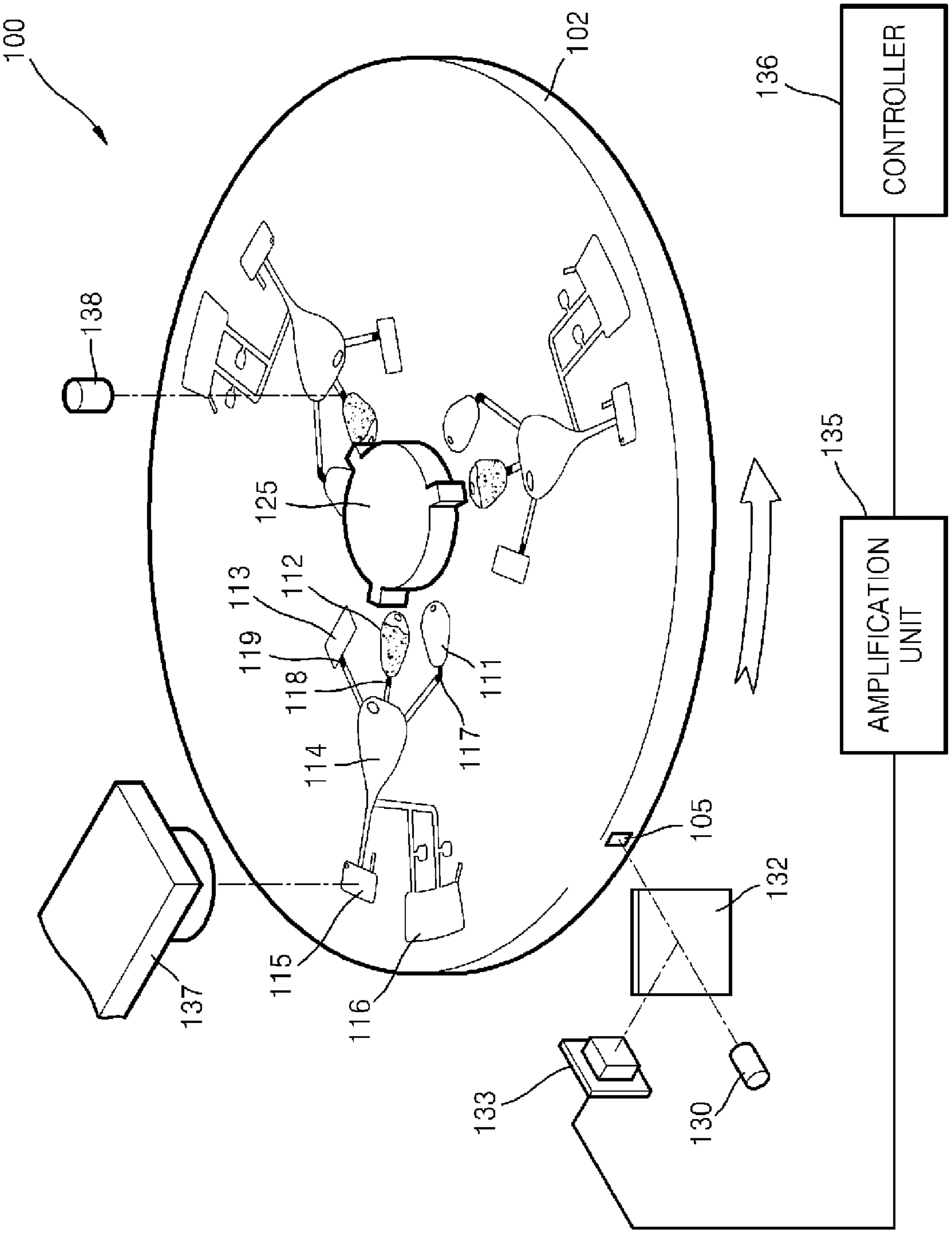
FIG. 1 is a perspective view of a centrifugal force based microfluidic system according to an embodiment of the present invention.
Figure 2:
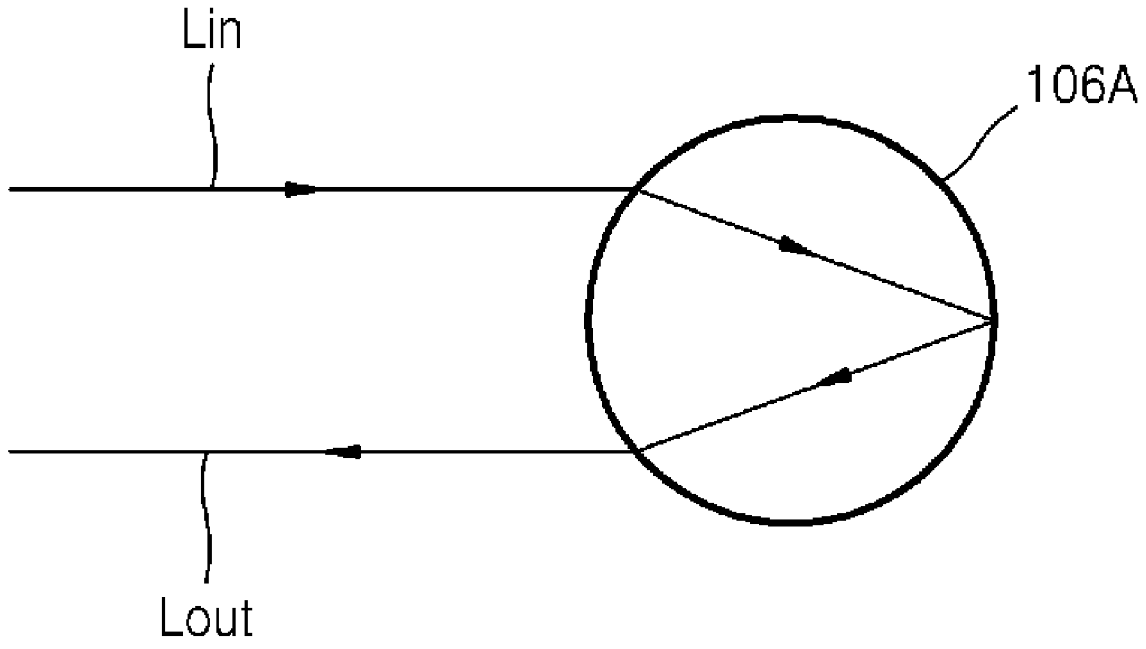
FIG. 2 is a diagram for explaining a retro-reflective property of light.
Figure 3A:
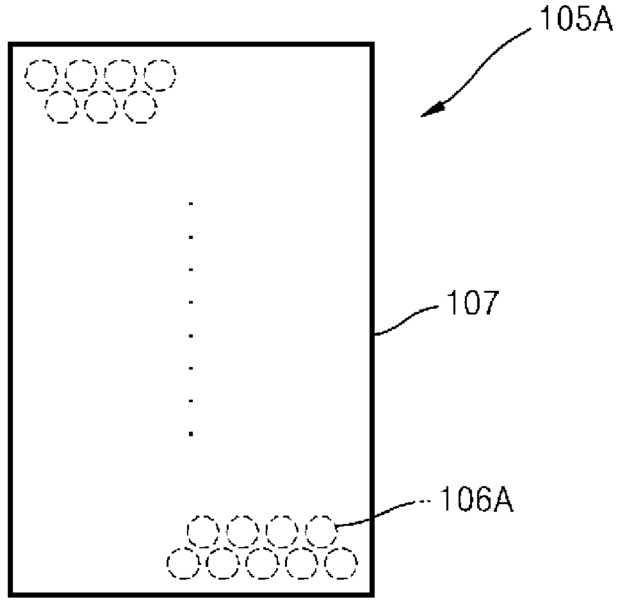
FIGS. 3A and 3B are a plan view and a cross-sectional view of a home mark included in a platform illustrated in FIG. 1, respectively, according to an embodiment of the present invention.
Figure 3B:
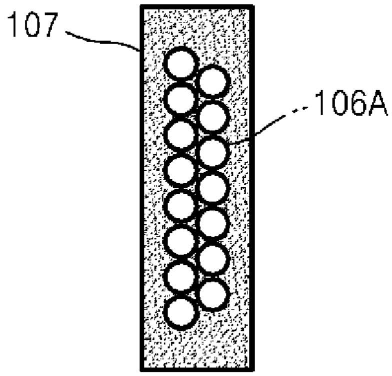
Figure 4A:
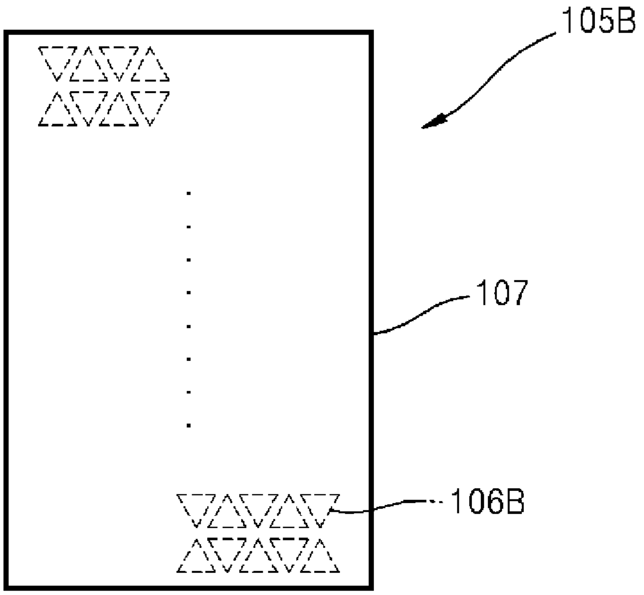
FIGS. 4A and 4B are a plan view and a cross-sectional view of a home mark included in a platform, respectively, according to another embodiment of the present invention.
Figure 4B:
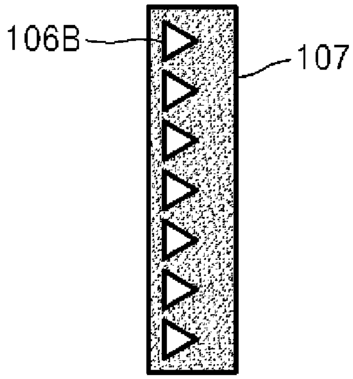
Figure 5:
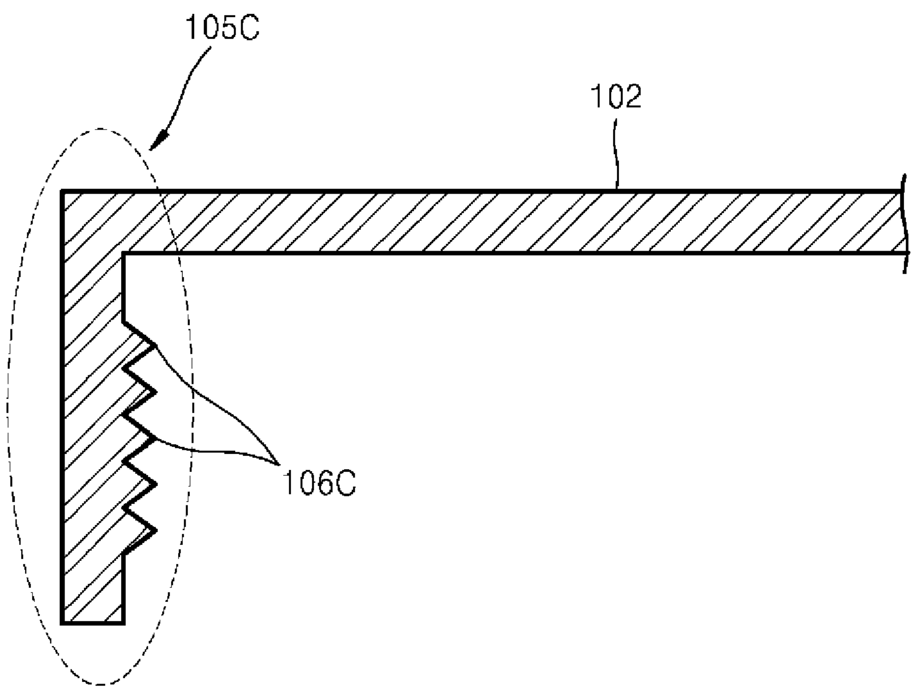
FIGS. 5 and 6 are cross-sectional views of home marks, according to embodiments of the present invention.
Figure 6:
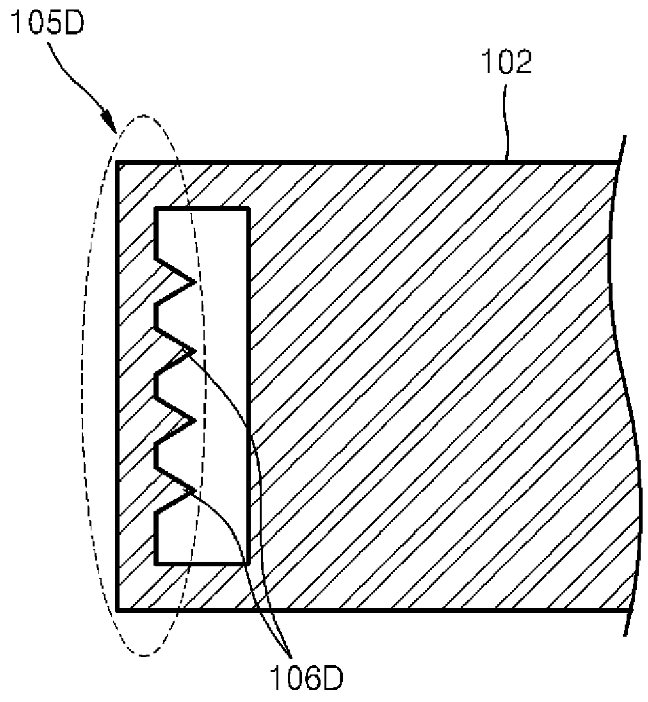
Figure 7:
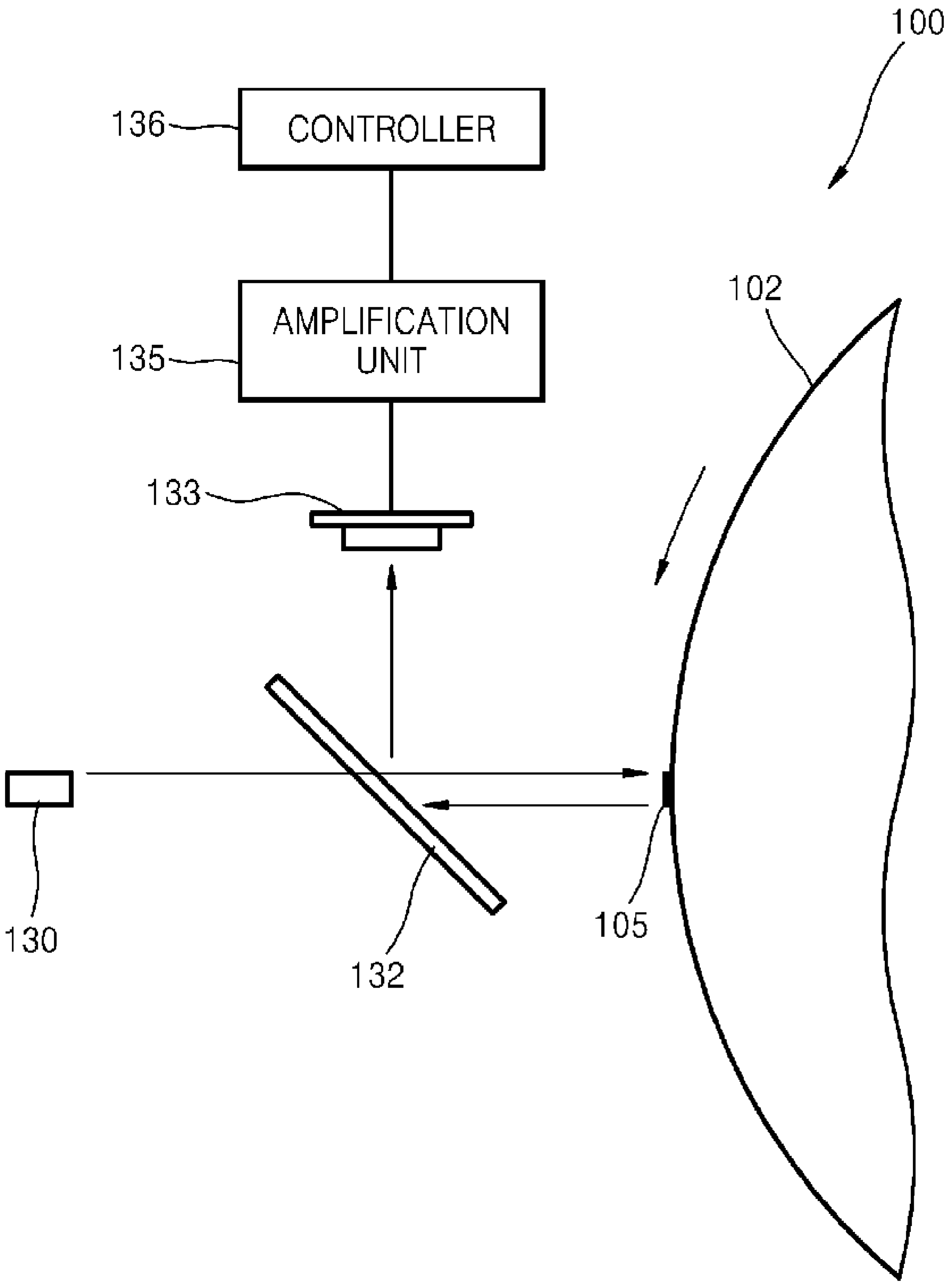
FIG. 7 is a schematic structural view of the centrifugal force based microfluidic system of FIG. 1.

FIG. 1 is a perspective view of a centrifugal force based microfluidic system 100 according to an embodiment of the present invention. FIG. 2 is a diagram for explaining a retro-reflective property of light. FIGS. 3A and 3B are a plan view and a cross-sectional view of a home mark 105A included in a platform 102 illustrated in FIG. 1, respectively, according to an embodiment of the present invention. FIGS. 4A and 4B are a plan view and a cross-sectional view of a home mark 105B included in a platform, respectively, according to another embodiment of the present invention. FIGS. 5 and 6 are cross-sectional views of home marks 105C and 105D, according to embodiments of the present invention. FIG. 7 is a schematic structural view of the centrifugal force based microfluidic system 100 of FIG. 1.

Referring to FIG. 1, the centrifugal force based microfluidic system 100 includes the platform 102 that is shaped as a rotatable disk, a spindle motor 125 as a kind of motor for rotating the platform 102 so as to be controlled, and a light-emitting unit 130, a light-receiving unit 133, an amplification unit 135 and a controller 136, which are used for determining a home position of the platform 102.

The platform 102 includes a chamber storing a minute amount of predetermined fluid, a channel through which the fluid flows, a valve for controlling flow of the fluid or various functional units receiving the fluid to perform predetermined functions thereon. In the exemplary embodiment of the platform shown in FIG. 1, the platform 102 is designed so as to perform and detect the results of immune serum reactions, and includes a sample chamber 111, a bead chamber 112, a mix chamber 114, a buffer chamber 113, a waste chamber 116, and a reaction chamber 115.

The sample chamber 111 accommodates a sample such as serum. The bead chamber 112 accommodates beads which is mixed with the sample. The beads (microparticles) are surface-treated to capture a target component which is contained in the sample. The mix chamber 114 accommodates a predetermined detection probe, which binds to the beads that capture the target component (e.g., a protein of interest). In the mix chamber 114, the sample, the beads and the detection probe are mixed. The buffer chamber 113 accommodates a buffer to dilute and rinse a mixing solution of the sample, the beads and the detection probe, and discharges residue. The waste chamber 116 accommodates the discharged residue. The reaction chamber 115 accommodates a predetermined substrate and enzyme which react with the detection probe that is attached to the beads. When the detection probe reacts with the substrate, the resulting product emits an optical signal. Also, the centrifugal force based microfluidic system 100 further includes a reaction detector 137 for detecting the optical signal which is generated by the reaction between the detection probe and the substrate.

The sample chamber 111, the bead chamber 112 and the buffer chamber 113 are each connected to the mix chamber 114. Valves 117, 118 and 119 controlling the flow of the fluid are arranged in each channel. The valves 117, 118 and 119 usually close their respective channels, but open their respective channels under a predetermined condition, and the valves 117, 118 and 119 may be referred to as normally closed valves. The centrifugal force based microfluidic system 100 further includes an external power source 138 for providing power to the valves 117, 118 and 119, and the external power source 138 may be a laser light source which emits a laser beam. It should be noted that, even though a detailed description is given above for a purpose of describing an exemplary configuration of a platform which is encompassed by the invention, various modifications and adjustments may be made to the configuration and structure of the platform.

The platform 102 includes a home mark 105 externally disposed on a circumferential surface of the platform 102, and radially distanced from a rotational center of the platform 102. The home mark 105 has a retro-reflective property of light. An install hole (not shown) is formed in the rotational center of the platform 102 to detachably install the platform 102 with the spindle motor 125.

Retro-reflective property of the home mark 105 allows the home mark 105 to reflect light back to its source. Glass beads and microprisms are examples having such retro-reflective property. Referring to FIG. 2, incident light $L_{in}$, incident on a glass bead 106A shaped as a sphere, and reflective light $L_{out}$, which passed through the glass bead 106A to be emitted, are parallel to each other. However, when the size of the glass bead 106A is small (e.g., up to several millimeters), the optical paths of the incident light $L_{in}$ and the reflective light $L_{out}$ are substantially superposed. Likewise, microprisms also reflect light of which the optical paths substantially superpose with that of the incident light.

The home mark 105 may be a reflective sheet type home mark 105A, as illustrated in FIGS. 3A and 3B, formed by uniformly arranging a plurality of glass beads 106A in a flexible film 107. Alternatively, the home mark 105 may be a reflective sheet type home mark 105B, as illustrated in FIGS. 4A and 4B, formed by uniformly arranging a plurality of microprisms 106B in a flexible film 107. The reflective sheet type home marks 105A and 105B may be cut into predetermined sized-pieces, and then be adhesively attached to the circumferential surface of the platform 102. Although not illustrated, reflective pigments may be formed by mixing the glass beads 106A in a melted resin so that the glass beads 106A are uniformly arranged. Then, the reflective pigments are coated on the circumferential surface of the platform 102, thereby completing the home mark 105. The lengths of the home mark 105 may be about 5 mm and about 1 mm, which are measured in directions perpendicular and parallel to top and bottom surfaces of the platform 102, respectively.

In another exemplary embodiment, as illustrated in FIG. 5, the home mark 105 may be the home mark 105C including a plurality of microprisms 106C, which protrude from an inner surface of a side wall of the platform 102. Unevenness is formed by heating and pressurizing the inner surface of the side wall of the platform 102 by using a roller having patterns corresponding to the shapes of the microprisms 106C, thereby completing the home mark 105C including the microprisms 106C that are engraved directly in the platform 102.

In still another exemplary embodiment, the home mark 105 may be formed when the platform 102 is molded by using a mold. For example, as illustrated in FIG. 6, in the case of the home mark 105D including a plurality of microprisms 106D formed in the platform 102, the home mark 105D may be formed by injection molding wherein patterns corresponding to the microprisms 106D are inserted into a mold and then a molded platform 102 is produced.

Referring to FIGS. 1 and 7, the light-emitting unit 130 emits light towards the circumferential surface of the platform 102. That is, the light-emitting unit 130 emits light to a spot of the platform 102 so that the light is incident on the home mark 105 only at a point of time when the platform 102 rotates at a predetermined position during one rotation of the platform 102. The light-emitting unit 130 may include a light source such as a light emitting diode (LED) emitting visible rays, and a laser diode (LD) emitting a laser beam. However, light emitted from the LD is more concentrated than in the case of the LED. In particular, the LD emitting a laser beam having a wavelength of about 650 nm may be used as a light source. Although not illustrated, the light-emitting unit 130 may further include a collimating lens concentrating light emitted from the light source.

The light-receiving unit 133 detects reflective light that is incident on the home mark 105 to be retro-reflected, and may include a photo diode detecting incident light based on a photovoltaic effect. The photo diode detects the incident light, and then generates electrical signals having sizes corresponding to the intensity of the incident light.

The centrifugal force based microfluidic system 100 includes a half mirror 132 as an optical path converter such that the half mirror 132 is disposed on an optical path of incident light proceeding from the light-emitting unit 130 towards the platform 102. The half mirror 132 passes light emitted from the light-emitting unit 130 towards the platform 102, and reflects reflective light, which is retro-reflected by the home mark 105 back to the light-emitting unit 130, towards the light-receiving unit 133.

The home mark 105 having the retro-reflective property of light maintains the reliability of the centrifugal force based microfluidic system 100 in that a home of the platform 102 can be reliably detected despite of an assembling error and shake to the platform 102. For example, although the home mark 105 is not exactly perpendicular to incident light of the light-emitting unit 130 due to a shake and inclination of the platform 102 during its operation, reflective light proceeds towards the light-emitting unit 130 so as to be reflected by the half mirror 132, and then is incident on the light-receiving unit 133, On the other hand, if a home mark is a mirror on which light is incident and reflected at incident and reflective angles, respectively, which are equal to each other, when the home mark is not exactly perpendicular to incident light due to a shake and inclination of the platform 102, reflective light may deviate from a desired direction, and thus, the reflective light may not proceed towards the half mirror 132. In this case, the home mark may be not detected since the reflected light is not incident on the light-receiving unit 133. The home mark 105 having the retro-reflective property of light can prevent a false detection of the home of the platform 102, unlike in the case where a mirror is used. Also, the home mark 105 can prevent the false detection of the home of the platform 102 due to errors generated when the home mark 105 is formed with or attached to the platform 102. The amplification unit 135 removes a signal selected from electrical signals having sizes corresponding to the intensity of the reflective light, where the size of the signal is smaller than a predetermined size, and passes and amplifies selectively only a signal of which size is greater than or equal to the predetermined size. Thus, the centrifugal force based microfluidic system 100 can accurately determine the home position of the platform 102 without interruption generated due to light reflected from a portion of a surface of the platform 102, which is adjacent to the home mark 105, not on the home mark 105. In particular, the amplification unit 135 may include an operational (OP) amplifier, and the predetermined size may be, for example, 0.5 μA. The controller 136 determines the home position of the platform 102, based on the electrical signal having a size corresponding to the intensity of the reflective light and amplified through the amplification unit 135.

Figure 8:
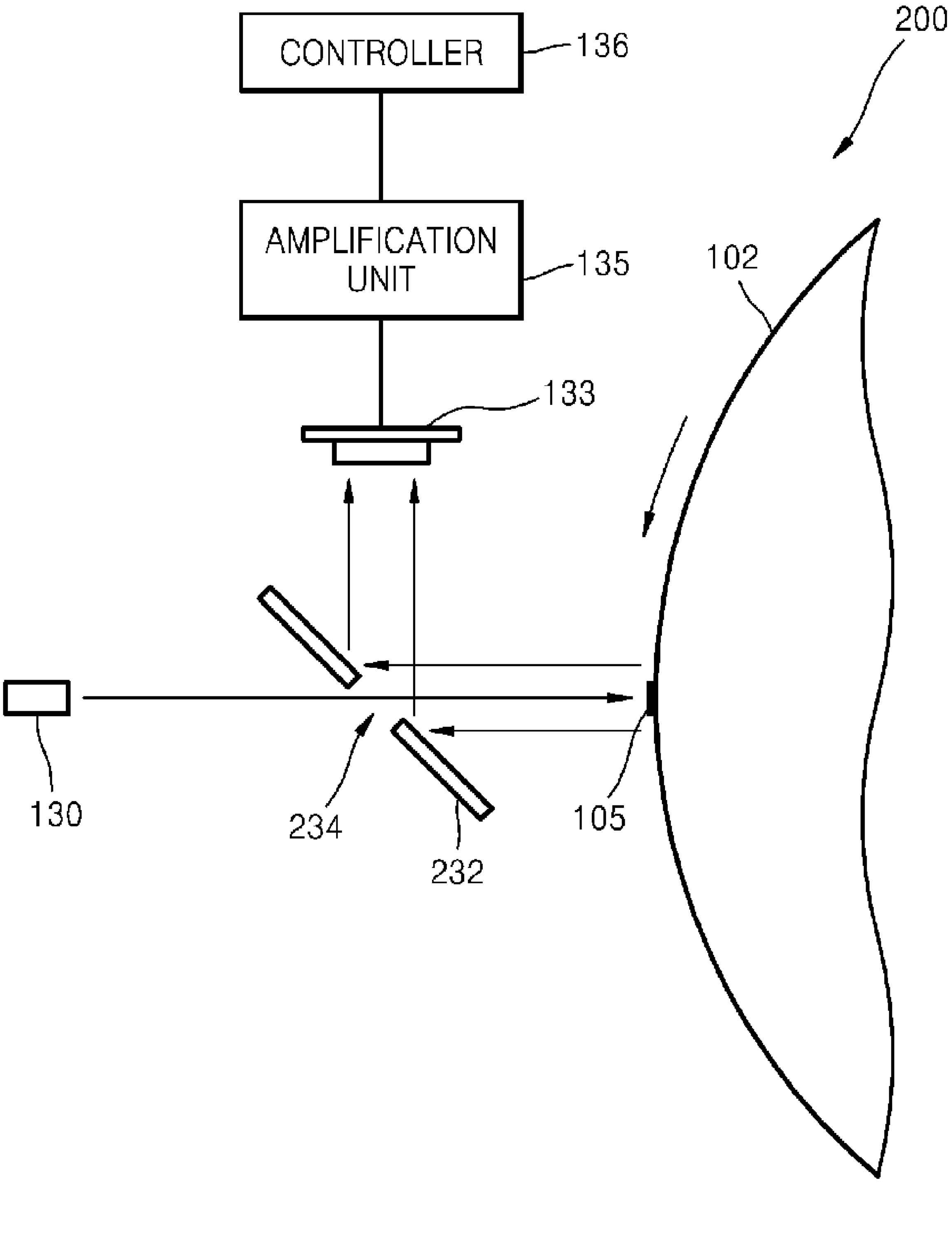
FIGS. 8 and 9 each are schematic structural views of centrifugal force based microfluidic systems, according to embodiments of the present invention.
Figure 9:
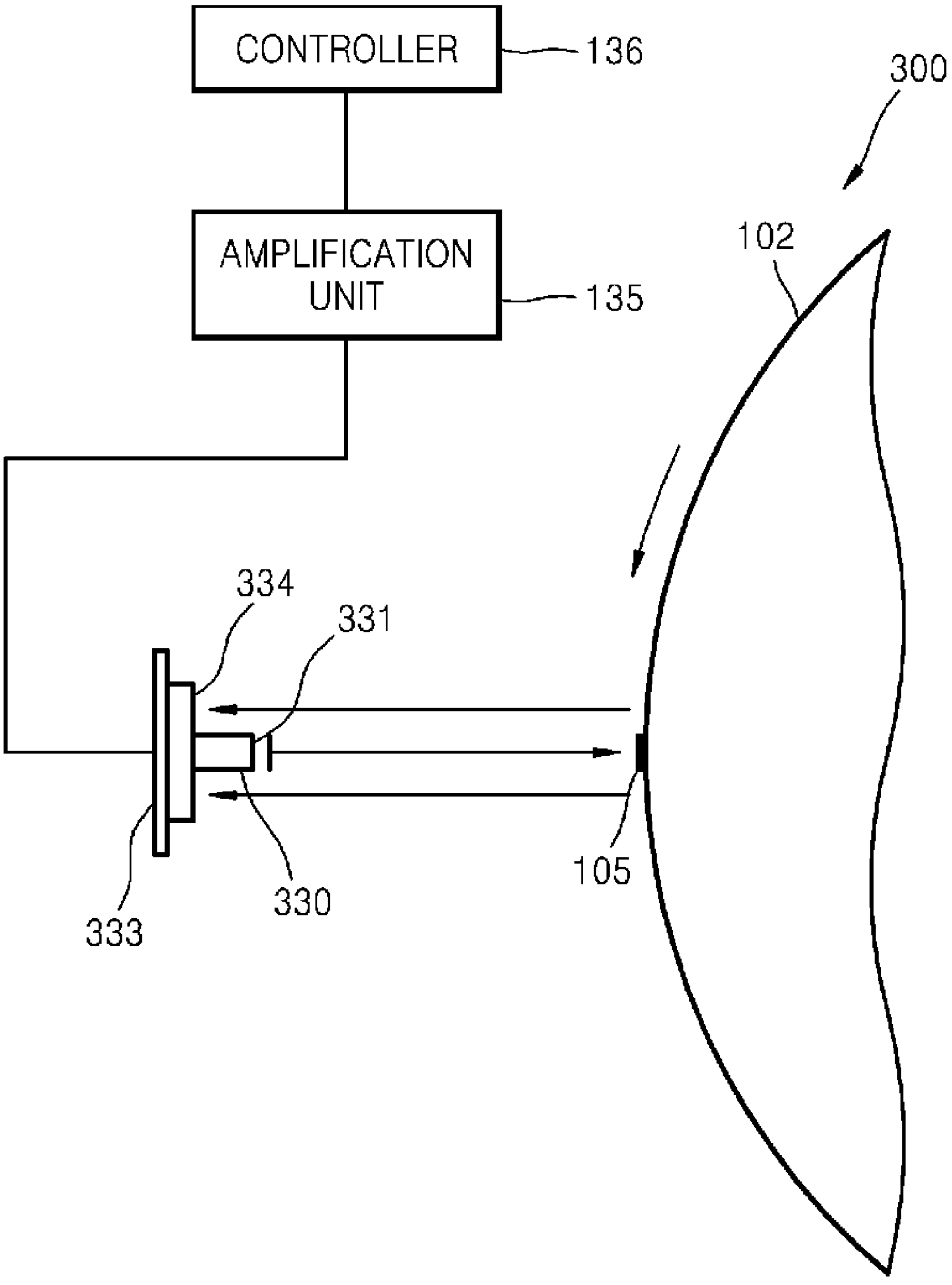

FIGS. 8 and 9 are schematic partial structural views of centrifugal force based microfluidic systems 200 and 300, respectively, according to embodiments of the present invention. The same reference numerals in FIGS. 8 and 9, and FIGS. 1 and 7 denote the same elements, and thus their description will be omitted.

In the exemplary centrifugal force based microfluidic system 200 of FIG. 8, which shows only the part where the home mark 105 is disposed, the platform 102 (partially shown) is a rotatable disk and includes the home mark 105 formed on the circumferential surface of the platform 102. The system 200 includes the spindle motor 125 (see FIG. 1) for rotating the platform 102 in a controlled manner, and the light-emitting unit 130, the light-receiving unit 133, the amplification unit 135 and the controller 136, which are used for determining a home position of the platform 102, In addition, the centrifugal force based microfluidic system 200 includes a mirror 232 as an optical path converter such that the mirror 232 is disposed on an optical path of incident light proceeding from the light-emitting unit 130 towards the platform 102 and includes a window 234 formed in the center of the mirror 232. Light emitted from the light-emitting unit 130 passes through the window 234, so as to be incident on the circumferential surface of the platform 102. However, since the diameter of the window 234 is small enough, e.g., 1 mm, most of the reflective light, which is retro-reflected by the home mark 105 back to the light-emitting unit 130, is reflected towards the light-receiving unit 133 by the mirror 232. As described above, the home mark 105 having the retro-reflective property of light maintains the reliability of the centrifugal force based microfluidic system 200 in that a home of the platform 102 can be reliably detected even when the platform 102 has an assembling error, or when there exist errors due to a shake and inclination of the platform 102 during its operation, or errors generated when the home mark 105 is formed with or attached to the platform 102.

In another exemplary embodiment, the centrifugal force based microfluidic system 300 of FIG. 9 includes the platform 102 shaped as a rotatable disk and including the home mark 105 formed on a circumferential surface of the platform 102, the spindle motor 125 (see FIG. 1) which rotates the platform 102 in a controlled manner, and a light-emitting unit 330, a light receiving unit 333, the amplification unit 135 and the controller 136, which are used for determining a home position of the platform 102.

An emitting surface 331 of the light-emitting unit 330 and a receiving surface 334 of the light receiving unit 333 face the platform 102, i.e., the circumferential surface of the platform 102. The light receiving unit 333 overlaps a portion of the light-emitting unit 330. In addition, the light-emitting unit 330 is closer to the platform 102 than the light receiving unit 333.

Light, which is emitted from the light-emitting unit 330, is incident on the circumferential surface of the platform 102, and most of the reflective light, which is retro-reflected by the home mark 105 back to the light-emitting unit 130, is incident and detected on the receiving surface 334 of the light receiving unit 333, which is wider than the light-emitting unit 330. As described above, the home mark 105 having the retro-reflective property of light maintains the reliability of the centrifugal force based microfluidic system 300 by detecting a home position of the platform 102.

Figure 10:
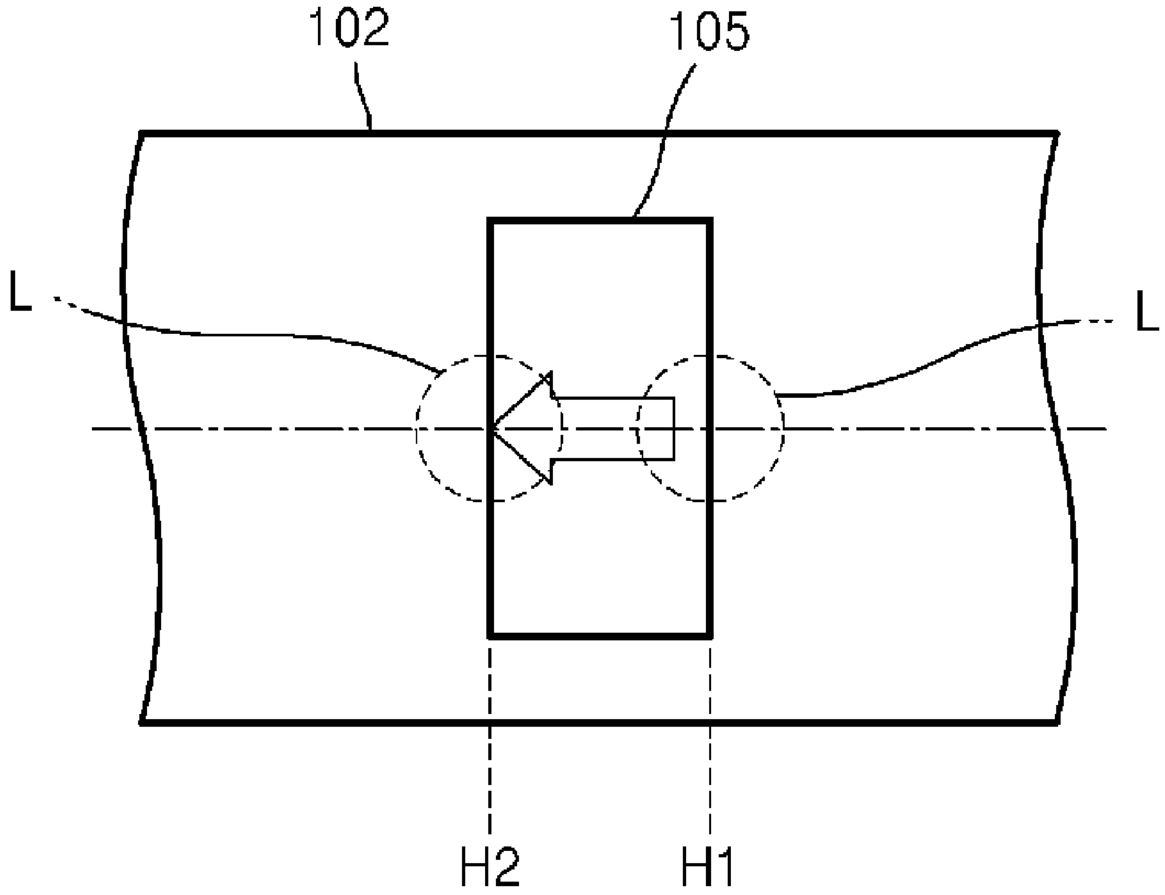
FIG. 10 is a diagram for explaining a method of determining a home position of a centrifugal force based platform, according to an embodiment of the present invention.

FIG. 10 is a diagram for explaining a method of determining a home position of a centrifugal force based platform 102, according to an embodiment of the present invention. Hereinafter, the method of determining the home position of the centrifugal force based platform 102, according to the current embodiment of the present invention, will be described with reference to FIGS. 1 and 10.

First, the platform 102 is installed with the spindle motor 125 (in FIG. 1). By driving the spindle motor 125, the platform 102 is counterclockwise rotated as indicated by the arrow illustrated in FIG. 1. Next, the light-emitting unit 130 emits light. The emitted light passes through the half mirror 132 so as to be incident on the circumferential surface of the platform 102.

As the platform 102 rotates, the home mark 105 formed on the circumferential surface of the platform 102 rotates. Thus, from the point of view of the home mark 105, emitted light L from the light-emitting unit 130 moves to the left, as indicated by the arrow illustrated in FIG. 10. When the emitted light L is scanned and once the emitted light L enters the home mark 105 at a point H1, the size of the electrical signal, which corresponds to the intensity of the reflective light, is suddenly increased. Thus, the controller 136 can determine the point H1 as the home position of the platform 102 by detecting the sudden increase in the size of the electrical signal.

The emitted light L of the light-emitting unit 130 enters the home mark 105, and exits from the home mark 105 at a position H2. At this point, the size of the electrical signal, which corresponds to the intensity of the reflective light, is suddenly decreased. According to another embodiment of the present invention, the controller 136 can determine the position H2 as the home position of the platform 102 by detecting the sudden decrease in the size of the electrical signal.

In order to detect results of reactions in the reaction chamber 115, information on relative positions of the reaction chamber 115 is required. Such information on the relative positions of the reaction chamber 115 and the valves 117, 118 and 119 to which power needs to be supplied, is stored in a memory (not shown) connected to the controller 136. Thus, when the controller 136 determines the home position of the platform 102, it rotates the platform 102 by an angle corresponding to the relative position of the reaction chamber 115 or the relative position of the valves 117, 118 and 119 by appropriately controlling the spindle motor 125. Thus, the reaction chamber 115 can be aligned below the reaction detector 137, and the valves 117, 118 and 119 can be aligned below the external power source 138.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A centrifugal force based microfluidic system comprising:

a rotatable platform which comprises a home mark which retro-reflects light incident on the home mark;

a motor rotating the platform in a controlled manner;

a light-emitting unit emitting the light to a spot of the platform so as to be incident on the home mark only at a point of time when the platform rotates at a predetermined position;

a light-receiving unit detecting the incident light that is incident on the home mark and retro-reflected by the home mark; and;

a controller determining the home position of the platform based on the retro-reflected light detected by the light-receiving unit, and a mirror which is positioned between the light emitting unit and the platform, wherein the mirror passes the incident light emitted by the light emitting unit so that the light is incident on the platform, wherein the mirror reflects light, which is the retro-reflected light, that is reflected by the home mark towards the light-receiving unit, and wherein the mirror is a mirror with a window or a half mirror, wherein the home mark retro-reflects the light incident on the home mark, so that the retro-reflected light is directed to the light-emitting unit, on a light path which is substantially same as a light path of the incident light.

2. The system of claim 1, wherein the light-emitting unit comprises a laser diode (LD).

3. The system of claim 1, wherein the light-receiving unit comprises a photo diode.

4. The system of claim 1, wherein the light-emitting unit and the light receiving unit face the platform, wherein the light-receiving unit overlaps a portion of the light-emitting unit, and wherein the distance between the light-emitting unit and the platform is shorter than the distance between the light-receiving unit and the platform.

5. The system of claim 1, further comprising:

an amplification unit passing and amplifying selectively a signal that is detected by the light-receiving unit and which has a size greater than or equal to a predetermined size.

6. The system of claim 1, wherein the home mark is disposed on a circumferential surface of the platform.

7. The system of claim 1, wherein the home mark comprises one of a plurality of glass beads and a plurality of microprisms, which are regularly arranged.

8. The system of claim 7, wherein the microprisms are protrusions protruding from an inner surface of a side wall of the platform.

9. The system of claim 1, wherein the home mark is a retro-reflective sheet or retro-reflective pigments.

10. The system of claim 1, wherein the home mark is disposed inside the platform at a circumferential area of the platform.

11. A method of determining a home position of a centrifugal force based platform, the method comprising:

rotating the platform formed and comprising a home mark which retro-reflects light incident on the home mark;

emitting the light from a light-emitting unit to the platform so as to be incident on the home mark; and detecting light that is retro-reflected by the home mark, with a light-receiving unit, and then determining the home position of the platform based on the detected light, wherein the home mark retro-reflects the light, emitted from the light-emitting unit and incident on the home mark, so that the retro-reflected light is directed to the light-emitting unit, on a light path which is substantially same as a light path of the incident light, wherein a mirror which is positioned between the light emitting unit and the platform, wherein the mirror passes the incident light emitted by the light emitting unit so that the light is incident on the platform, wherein the mirror reflects light, which is the retro-reflected light, that is reflected by the home mark towards the light-receiving unit, and wherein the mirror is a mirror with a window or a half mirror.

12. The method of claim 11, wherein the detecting the light further comprises:

passing and amplifying selectively a signal that is detected by the light-receiving unit and has a size greater than or equal to a predetermined size.

13. The method of claim 11, wherein the detecting the emitted light further comprises:

determining a point at which the retro-reflected light is not detected any more after the light is retro-reflected by the home mark so as to be detected by the light-receiving unit.

* * * * *